United States Patent
Korobov et al.

(10) Patent No.: US 11,521,610 B1
(45) Date of Patent: Dec. 6, 2022

(54) SYSTEM AND METHOD FOR CONTROLLING A REMOTE COMPUTER USING AN INTELLIGENT PERSONAL ASSISTANT

(71) Applicant: Parallels International GmbH, Schaffhausen (CH)

(72) Inventors: Ivan Korobov, Moscow (RU); Andrey Omelyanchuk, Moscow (RU); Nikolay Dobrovolskiy, Moscow (RU); Serguei M. Beloussov, Costa del Sol (SG)

(73) Assignee: Parallels International GmbH, Schaffhausen (CH)

( * ) Notice: Subject to any disclaimer, the term of this patent is extended or adjusted under 35 U.S.C. 154(b) by 149 days.

(21) Appl. No.: 16/701,291

(22) Filed: Dec. 3, 2019

Related U.S. Application Data

(63) Continuation of application No. 15/472,359, filed on Mar. 29, 2017, now Pat. No. 10,529,327.

(51) Int. Cl.
| | |
|---|---|
| *G10L 15/22* | (2006.01) |
| *G06F 21/32* | (2013.01) |
| *G10L 15/18* | (2013.01) |
| *G06F 8/61* | (2018.01) |
| *H04M 1/27* | (2006.01) |
| *H04M 1/253* | (2006.01) |
| *H04L 65/1069* | (2022.01) |
| *G10L 15/30* | (2013.01) |

(52) U.S. Cl.
CPC ............ *G10L 15/22* (2013.01); *G06F 8/61* (2013.01); *G06F 21/32* (2013.01); *G10L 15/1815* (2013.01); *G10L 15/30* (2013.01); *H04L 65/1069* (2013.01); *H04M 1/2535* (2013.01); *H04M 1/271* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,544,069 B1 * | 9/2013 | Subbiah | ............... | H04L 63/08 |
| | | | | 726/4 |
| 8,595,642 B1 * | 11/2013 | Lagassey | ............... | G06F 3/048 |
| | | | | 715/781 |
| 9,972,318 B1 * | 5/2018 | Kelly | ............... | G10L 15/22 |

(Continued)

*Primary Examiner* — Jakieda R Jackson
(74) *Attorney, Agent, or Firm* — Rosenberg, Klein & Lee

(57) ABSTRACT

Described herein is a system and method for controlling a remote computer over a remote session. In an exemplary aspect, the method comprises receiving, by an intelligent personal assistant (IPA), a speech-based instruction from a user of a mobile device, the speech-based instruction comprising a request to execute a task; in response to determining, based on analysis of the speech-based instruction, an intent of the user to initiate the remote session with the remote computer: identifying, by the IPA, a remote client on the mobile device for creating the remote session with the remote computer via the cloud infrastructure; generating, by the IPA, a command object that causes a software agent on the remote computer to execute the task; and transmitting, by the IPA, the command object through the remote session to the remote computer; and presenting results for execution of the task in an interface of the remote client.

19 Claims, 5 Drawing Sheets

(56) References Cited

U.S. PATENT DOCUMENTS

| | | | |
|---|---|---|---|
| 10,666,748 B2* | 5/2020 | Mathis | H04L 67/22 |
| 2007/0053513 A1* | 3/2007 | Hoffberg | G06K 9/00369 |
| | | | 380/201 |
| 2007/0174080 A1* | 7/2007 | Outwater | G06Q 20/10 |
| | | | 705/42 |
| 2013/0132584 A1* | 5/2013 | Palladino | G06F 9/541 |
| | | | 709/226 |
| 2014/0119531 A1* | 5/2014 | Tuchman | H04M 3/5166 |
| | | | 379/265.09 |
| 2014/0142945 A1* | 5/2014 | Fry | G10L 15/26 |
| | | | 704/254 |
| 2014/0189808 A1* | 7/2014 | Mahaffey | H04L 63/083 |
| | | | 726/4 |
| 2015/0089614 A1* | 3/2015 | Mathew | H04L 65/1069 |
| | | | 726/7 |
| 2015/0149540 A1* | 5/2015 | Barker | H04L 12/1827 |
| | | | 709/204 |
| 2015/0163676 A1* | 6/2015 | Seo | H04W 4/50 |
| | | | 455/410 |
| 2016/0127447 A1* | 5/2016 | Jiang | G06F 3/0486 |
| | | | 709/203 |
| 2016/0134616 A1* | 5/2016 | Koushik | H04L 63/08 |
| | | | 726/9 |
| 2017/0086069 A1* | 3/2017 | Liu | H04L 9/3213 |
| 2017/0099280 A1* | 4/2017 | Goel | H04L 63/0815 |
| 2018/0137291 A1* | 5/2018 | Ho | G06F 16/164 |
| 2020/0251107 A1* | 8/2020 | Wang | G10L 15/02 |
| 2020/0301660 A1* | 9/2020 | Kelly | G06F 3/167 |

* cited by examiner

SYSTEM AND METHOD FOR CONTROLLING A REMOTE COMPUTER USING AN INTELLIGENT PERSONAL ASSISTANT

CROSS-REFERENCE TO RELATED APPLICATIONS

This application claims benefit of priority to U.S. patent application Ser. No. 15/472,359 filed on Mar. 29, 2017, which is herein incorporated by reference in its entirety.

TECHNICAL FIELD

The present disclosure generally relates to operating and accessing data using a legacy operating system, and, more particularly, to a system and method for enabling voice recognition for legacy operating systems of computing devices.

BACKGROUND

Recently, many major mobile and desktop operating systems ("OSs"), such as iOS, Android, macOS, and Windows, have released support for intelligent personal assistants ("IPAs"), such as Apple's Siri, Google Assistant, Microsoft's Cortana and the like. In general, an IPA is a software agent that can perform tasks or services for an individual/operator of the device on which it is installed. These tasks and services are based on user input, location awareness, and the ability to access information from a variety of online sources (such as weather or traffic conditions, news, stock prices, user schedules, retail prices, and the like). Thus, this technology helps individuals/operators perform various actions like searching for files, photos and other data, launching applications, starting VoIP (voice over Internet) calls, sending messages, and the like, by orally communicating instructions to the IPA in a natural human language.

On desktops, the IPA technology is available on the latest version of the operating systems only (e.g., macOS Sierra—version 10.12 and Windows 10). In contrast, if a user has a desktop with an older operating system, the user cannot use a native IPA to operate the desktop since the IPA is integrated into operating system, but is not available as stand-alone add-on software application.

At the same time, IPAs are also available on major mobile operating systems, such as iOS and Android. Recently, Apple and Google have begun providing third-party software developers with software development kits ("SDK") that enables the creation of software applications for a certain software packages, such as Siri and Google Assistant. Using these application program interfaces ("APIs"), these third-party software developers can develop software applications to receive an individual operator's intent/instruction to perform an action and the related parameters for the action. Then, the application can fulfill the desired action while the IPA executes the low-level operations, such as voice recognition on different languages, command semantics analysis, and the like.

Because IPAs on mobile devices have been developed earlier and are more prominent than on desktop computing devices, there currently remain a significant number of desktop computers with legacy operating systems that will likely never receive native IPA support. Thus, even though some existing application programming interfaces for IPAs can pass a limited set of user's instructions (e.g., send a message, find a photo, make a VoIP call) to third-party applications, there remains a need for IPAs to interact with legacy operating systems on personal computing devices

SUMMARY

Accordingly, a system and method is disclosed for enabling voice recognition for legacy operating systems of computing devices. In one exemplary aspect, a method is provided for enabling voice recognition for an operating system. In this aspect, the method includes receiving, by a first computing device, a speech-based instruction from a user of the first computing device, the speech-based instruction indicating a request for execution of a task; analyzing, by an intelligent personal assistant running on the first computing device, the speech-based instruction to determine an intent of the user; calling a client software installed on the first computing device if the intent of the user identifies the client software; generating, by the client software, a command object that includes parameters relating to the execution of the task; and transmitting the command object, by the first computing device, to a second computing device having the operating system, wherein the command object causes a software agent on the second computing device to execute the task based at least partially on the parameters included in the command object.

According to another exemplary aspect of the method, the first computing device is a mobile device and the second computing device is one of a desktop computer or laptop computer.

According to another exemplary aspect of the method, the task comprises at least one of a request to search for at least one file on the second computing device, a request to launch a software application on the second computing device, a request to start VoIP call on the second computing device, and a request to transmit at least one electronic message on the second computing device.

According to another exemplary aspect, the method includes receiving, by the first computing device, electronic data from the second computing device in response to the execution of the task by the second computing device based at least partially on the parameters.

According to another exemplary aspect, the method includes installing the client software on the first computing device and the software agent on the second computing device; and pairing the client software to the software agent based on at least one of a user identification, an account identification and a password.

According to another exemplary aspect of the method, the analyzing of the speech-based instruction comprises performing automatic speech recognition and transcription of the speech-based instruction to identify an identification of the client software and calling the client software based on the identification.

According to another exemplary aspect, the method includes registering the client software as a software extension of the intelligent personal assistant.

According to another exemplary aspect of the method, the operating system of the second computing device is a legacy operating system that does not have functionality to execute an integrated intelligent personal assistant.

According to another exemplary aspect of the method, the operating system of the second computing device has a native intelligent personal assistant and does not have voice capturing facilities for the user to interact with the native intelligent personal assistant.

In one further exemplary aspect, a computing device is disclosed for enabling voice recognition for an operating system. In this aspect, the computing device includes an I/O interface configured to receive a speech-based instruction from a user that indicates a request for execution of a task; and a processor configured to analyze, using an intelligent personal assistant running on the computing device, the speech-based instruction to determine an intent of the user, call a client software installed on the computing device if the intent of the user identifies the client software, generate, using the client software, a command object that includes parameters relating to the execution of the task, and cause the command object to be transmitted to a computer having the operating system, wherein the command object causes a software agent on the computer to execute the task based at least partially on the parameters included in the command object.

In one further exemplary aspect, a non-transitory computer readable medium is provided that comprises computer executable instructions for enabling voice recognition for an operating system. In this aspect, instructions are provided for receiving, by a first computing device, a speech-based instruction from a user of the first computing device, the speech-based instruction indicating a request for execution of a task; analyzing, by an intelligent personal assistant running on the first computing device, the speech-based instruction to determine an intent of the user; calling a client software installed on the first computing device if the intent of the user identifies the client software; generating, by the client software, a command object that includes parameters relating to the execution of the task; and transmitting the command object, by the first computing device, to a second computing device having the operating system, wherein the command object causes a software agent on the second computing device to execute the task based at least partially on the parameters included in the command object.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
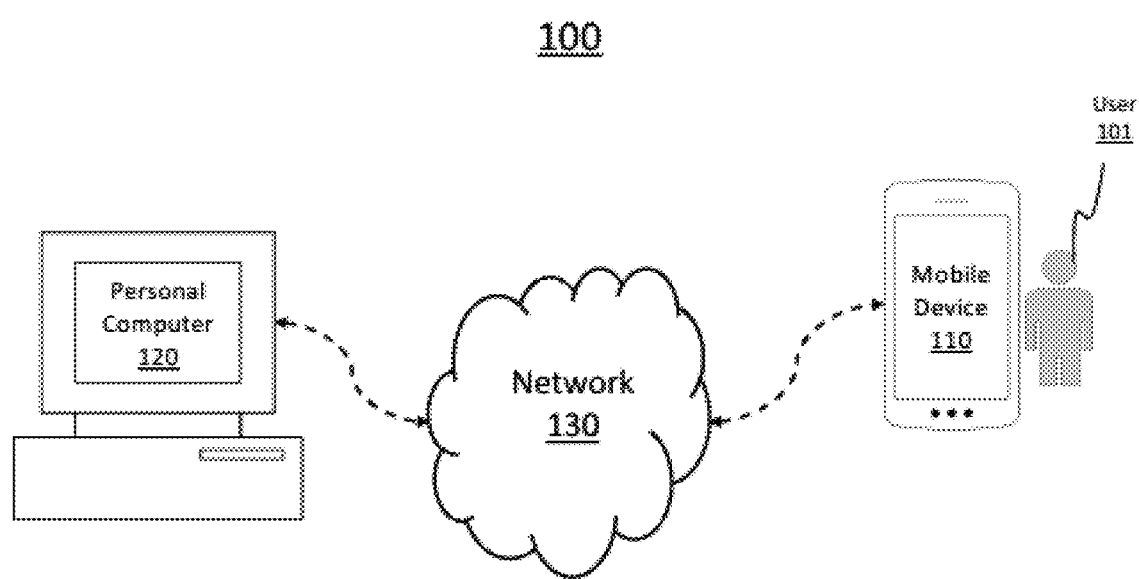
FIG. 1 illustrates a block diagram of a system for enabling voice recognition for legacy operating systems of computing devices according to an exemplary embodiment.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 illustrates a block diagram of a system for enabling voice recognition for legacy operating systems of computing devices according to an exemplary embodiment. As shown, the system 100 generally includes a mobile device 110, which can be operated by an individual user 101, a personal computer 120, and a network 130 that facilitates wireless communication between the mobile device 110 and personal computer 120. In general, the network 130 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network 130 may employ various well-known protocols to communicate information amongst the network resources. In one aspect, the network 130 can be part of the Internet or intranet using various communications infrastructure such as Ethernet, WiFi, Bluetooth and the like.

It is contemplated that the personal computer 120 is a desktop, laptop or similar computing device that includes a "legacy" operating system. For purposes of this disclosure, the term "legacy" or "legacy system" refers to current computing devices with older technology and application programs, i.e., "of, relating to, or being a previous or outdated computer system." More particularly, the term "legacy" in this context connotes an operating system that cannot directly operate with an IPA installed on the personal computer 120. This would be different than current operating systems running on recently released desktops and laptops, such as macOS Sierra (version 10.12) and Windows 10, that can support IPAs. Thus, the term "legacy" in other words assumes that the desktop computer 120 is running a legacy operating system that cannot have a native integrated IPA.

It should be appreciated that in alternative embodiments, the desktop computer 120 may have a native integrated IPA, but this software application cannot be executed/implemented by a user due to problems with voice capturing facilities, such as lacking the required I/O interface, such as a microphone or the like. In this case, the exemplary system and method will still be applicable as the user can access data, etc., on the desktop computer 120 using the specialized software and IPA on the mobile device 110.

Furthermore, the mobile device 110 can be any type of smartphone or similar mobile computing device that is integrated with an IPA running on the operating system of the mobile device 110. According to the exemplary aspect, the operating system of the mobile device 110 should provide an IPA integration API. Furthermore, the mobile device 110 will include a client software module installed therein that is configured to receive commands from the IPA on the mobile device 110, process these commands as instructions or request, and transmit corresponding command objects to the computer 120 with legacy operating system via network 130.

In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 2:
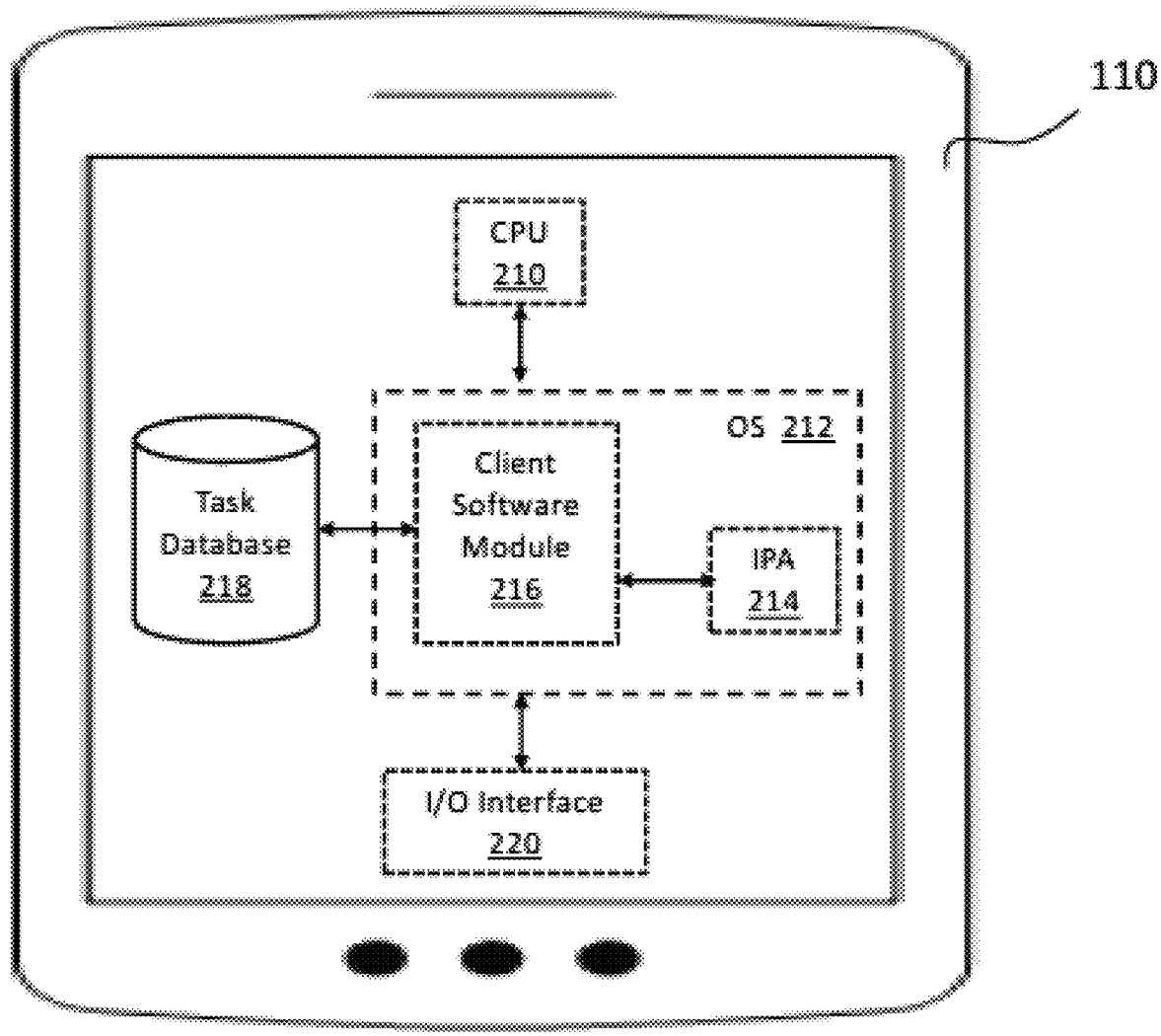
FIG. 2 illustrates a block diagram of a mobile device for enabling voice recognition for legacy operating systems of computing devices according to an exemplary embodiment.

FIG. 2 illustrates a more detailed block diagram of a mobile device for enabling voice recognition for legacy operating systems of computing devices according to an exemplary embodiment. As shown, the mobile device 110 includes a computer processing unit ("CPU") 210 and an operating system 212 configured to execute a plurality of software modules and applications. Although not shown in detail, the mobile device 110 also includes electronic memory that stores executable code for the software modules and applications that is executed by the CPU 210 to perform the algorithms disclosed herein. Moreover, it should be appreciated that while the exemplary system 100 utilizes a mobile device 110 to communicate with the legacy system, in an alternative aspect the device 110 can be a current desktop, laptop or other computing device that includes an operating system capable of being integrated with an IPA and having an IPA integration API for operating with third-party software applications.

In any event, as further shown, the mobile device 110 includes a conventional input/output ("I/O") interface 220 that includes the requisite hardware and software components to communicate with other processing systems, user 101, and the like. For example, the I/O interface 220 can include wireless communication components (modems, network cards, etc.) to facilitate network communication with network 130 and also include a speaker/microphone to receive oral communication instructions from user 101.

As noted above, the mobile device 110 includes a client software module 216. In addition, the mobile device 110 includes an IPA 214, which can be a conventional IPA (e.g., Apple's Siri) that is configured to receive voice commands from a user 101, and perform core functionality of such IPAs including speech recognition, image matching, natural language processing and question-and-answer processing, and the like. During operation, the operating system 212 of the mobile device 110 is provided to manage the computer hardware and software resources and to provide common services for both the IPA 214 and a client software module 216. In one example, the client software module 216 may be called "Parallels Client" and can be accessed by the user 101 by an oral instruction using this name, as will be discussed in detail below.

It is contemplated that the client software module 216 can be downloaded by a user 101 from an application database, such as an "Apps store", and automatically installed on the mobile device 110, for example. Upon installation of the client software module 216 on the mobile device 110, the client software module 216 registers itself as an IPA extension, i.e., a plug-in for the IPA 214 that adds specific functionality to the existing IPA software application. More particularly, in the exemplary aspect, the client software module 216 is configured to handle and process user instructions (i.e., user intents) in certain domains that are provided by the integration API of the IPA 214.

For example, in one aspect, on an iOS if the mobile device is an iPhone, interactions with Siri as the IPA 214 will occur by an "Intents" application extension as a special executable file/program, bundled together with the main application. The "Intents" application extension is configured to specify in its configuration file which tasks the client software module 216 is capable of handling, such as the managing of electronic photographs. Thus, in the exemplary aspect, the mobile device 110 will include electronic memory that can be a task database 218 configured instructions relating to which tasks the client software module 216 can handle.

In the current exemplary aspect, the IPA 214 (e.g., Siri) is configured to call the application extension when it recognizes a certain user's intent addressed to the application. For example, when a user 101 enters a voice command, the IPA 214 can use, for example, automatic speech recognition algorithms to transcribe the human speech (i.e., utterances of commands, questions, dictations and the like) into text. This text can then be translated to parsed text using natural language processing (i.e., part of speech tagging, noun-phrase chunking, dependency, constituent parsing and the like). Then using question and intent analysis algorithms to analyze the parsed text, the IPA 214 can detect commands and actions requested by user 101.

According to the exemplary aspect, if the software application extension requires the main application to handle the task/instruction requested by the user 101, the software application extension can return a corresponding response object to the IPA 214 that can, in turn, launch/activate the main application and pass user activity details to the main application via a user activity software object, such as an NSUserActivity. In general, "NSUserActivity" was introduced in Apple's iOS 8 and is used to provide data for a "handoff". Effectively, it enables a user to create activities in specific parts of a software application that can then be passed off to another instance of the application running on a different computing device. The receiving device can then continue the activity started on the previous device, picking up right where the user left off. Thus, in this instances, the NSUserActivity object enables the software application extension to pass the user activity details to the main application.

Thus, according to an example, the user 101 may first activate IPA 214 on the mobile device 110 and orally communicate speech-based commands/instructions, by saying, for example: "Using Parallels Client, Find for photos taken last winter in Alps on my computer". Other types of instructions can include, for example, searing for data files, launching applications, starting VoIP (voice over Internet)

calls, sending messages, and the like. In any event, the instructions will be received by I/O interface 220 (e.g., a microphone) and processed accordingly. Of course, this instruction is merely an example and the user can say any type of instruction/intent for performing some action that the IPA 214 is capable of interpreting as an action intent. Moreover, because the user 101 has specified the intent by saying "Parallels Client" (or any type of instruction identifying a request to use the client software module 216 and/or access to legacy system 120), the IPA 214 can uses its existing voice recognition technology to, in turn, recognize the intent of the user 101. In other words, since the intent as indicated in the user's oral instructions has been addressed to "Parallels Client", the client software module 216 is called back via a corresponding intent handler of the API 214, and intent related parameters, recognized and taken by the IPA 214 from the instruction are passed to the handler. It should be appreciated that exact intent handler realization and format of the parameters depend on the particular IPA 214 running on the particular operating system of the mobile device 110 and its integration API. In any event, as will be discussed below, once the client software module 216 is called back by the intent handler, the client software module 216 establishes communication with computing device 120.

Figure 3:
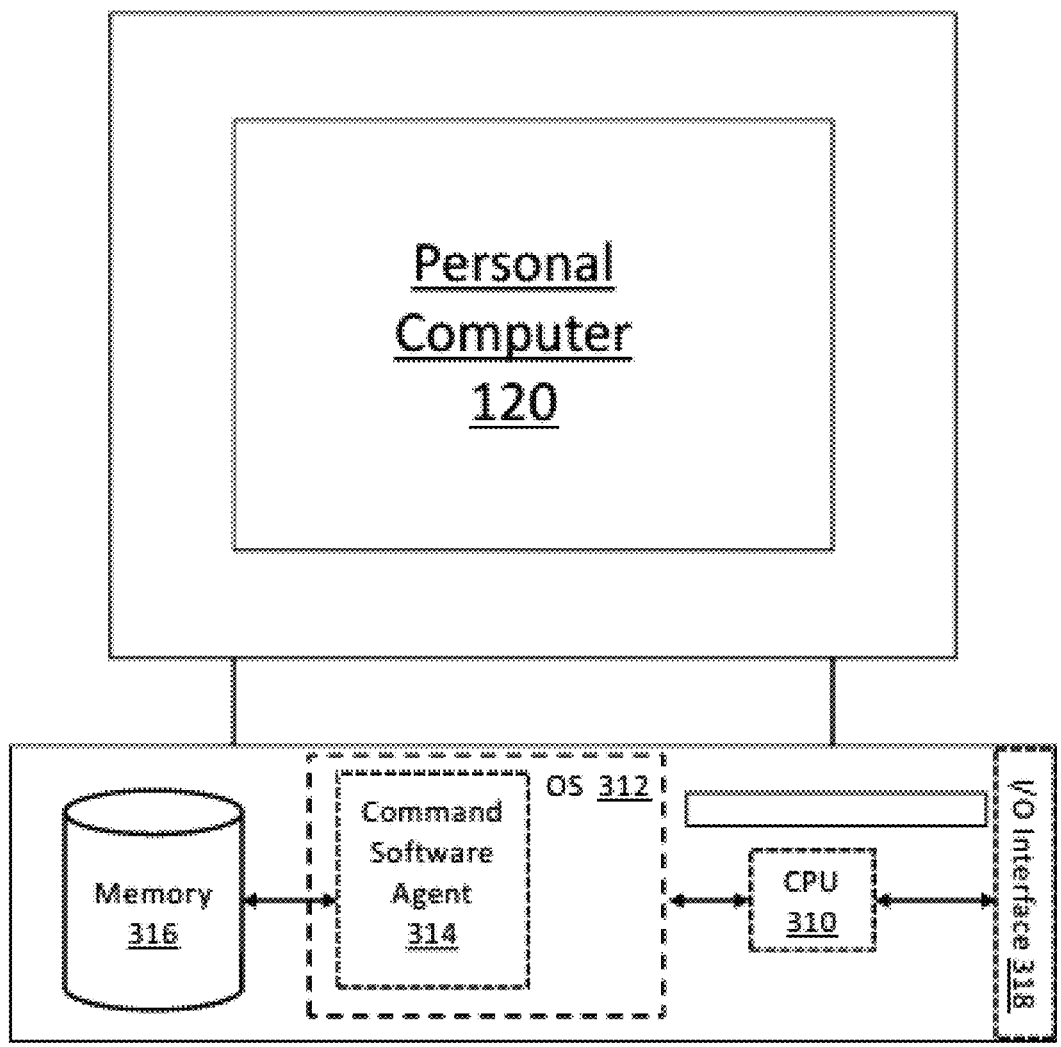
FIG. 3 illustrates a more detailed block diagram of a computing device with a legacy operating system according to an exemplary embodiment.

FIG. 3 illustrates a more detailed block diagram of a computing device with a legacy operating system according to an exemplary embodiment. As shown, the personal computer 120 can include a conventional I/O interface 318 that is provided to facilitate communication with other processing systems, such as mobile device 110. In this regard, I/O interface 318 can include the required software and hardware components facilitating communication over network 130.

Furthermore, the personal computer 120 can include a CPU 310 capable of executing an operating system 312, which, as described above, is a legacy operating system, which means that the operating system 312 cannot directly operated with an IPA installed on the personal computer 120 or otherwise have/execute a native integrated IPA because it does not have the current software and/or hardware functionalities to do so. Furthermore, the personal computer 120 includes memory 316 (e.g., the hard disk) that is conventional electronic memory and provided to store user electronic data, such as electronic photographs, videos, and the like.

According to the exemplary aspect, the personal computer 120 can have a command software agent 314 installed thereon. For example, the command software agent 314 can be considered a "Parallels Agent" in one exemplary aspect. During operation of the disclosed system and method, the client software module 216 is configured to establish a secure connection via network 130 to the command software agent 314. It is noted that for security purposes, the client software module 216 and the command software agent 314 can be paired together (for, example, based on at least one of a user identification, an account identification and a password) during initial setup by signing in to the same user account to guarantee that both devices belong to the same user. In other words, the user 101 can install the client software module 216 on his mobile device 110 and the command software agent 314 on his desktop computing device 120 with legacy operating system. Upon installation, each respective software can prompt the user to activate, which includes establish a user account, user name or the like, with the software administrator/distributor (of the distributed software) and registering both devices to this common name/account. As a result, the software administrator/distributor can ensure that both devices belong to the same user using existing techniques. Moreover, it should be appreciated that during registration, the user 101 can provide a name for each component in the system. For example, the desktop computing device can be labeled "My Computer" as be associated with a corresponding IP address. Thus, when formulating a command instruction as discussed below, client software module 216 is able to generate the instruction including the address of the target device.

According to exemplary aspects the client software module 216 of the mobile device 110 and the command software agent 314 of the personal computer 120 can be paired according to a "local" mode or a "remote" mode depending on the configurations and hardware capabilities of the two devices. For example, in the local mode, when the user 101 and a mobile device 110 are in proximity to the computer 120, and if the computer has a Bluetooth module (or similar close range communication functionality), the two devices 110 and 120 can discover and pair to each other via Bluetooth communication. Since the pairing operation requires explicit confirmation from the user 101, both devices 110 and 120 should be operated by the same person (or entity that can provide the confirmation) at the same time. After pairing, the client software module 216 and the command software agent 314 can then exchange security tokens/certificates to establish secure connection channel with each other using Bluetooth communication, for example.

Moreover, according to the exemplary aspect, the two devices will pair using the remote mode when the mobile device 110 is not close to the personal computer 120, or the personal computer 120 has no Bluetooth module (or similar close range communication capabilities), so the two devices 110 and 120 cannot be paired via Bluetooth, for example.

In this aspect, if both the mobile device 110 and the personal computer 120 are near to the user 110, the command software agent 314 can broadcasts its presence, so that the client software module 216 can discover the personal computer via Wi-Fi, for example. Once discovered, the client software module 216 and the command software agent 314 can authorize data communication with each other by a passcode or a QR code, for example. For a passcode, the command software agent 314 can be configured to generate and display, for example, a 6-digit passcode, which the user 101 can type into an interface of the client software module 216 on the mobile device 110. If the passcode is entered correctly, the client software module 216 and the command software agent 314 can again exchange security tokens/certificates for further secure connection. Moreover, when a QR code is used, the command software agent 314 can generate and display a QR code, which can be scanned by the client software module 216, confirmed with the command software agent 314, and then the client software module 216 and the command software agent 314 can again exchange security tokens/certificates for further secure connection In yet a further refinement of this aspect, if the user 101 with the mobile device 110 is not in proximity to the personal computer 120, but still needs to communicate with it, authentication can be made via a cloud infrastructure, such as Parallels Cloud infrastructure, for example. Thus, after the command software agent 314 is installed, and if the user 101 wants to use the voice recognition/command feature remotely, the user 101 should sign in to his or her his Parallels Account from the command software agent 314. After sign in, the personal computer 120 is registered in Parallels Cloud infrastructure. To then access to the personal computer 120 via the mobile device 110, the user 101 should sign in to the same Parallels Account from the client software module 216 on the mobile device 110. After sign in, the client software module 216 can query the Parallels Cloud infrastructure for the list of registered host(s), and after the list is received by mobile device 110, the user 101 can operate the personal computer(s) 120 remotely from the client software module 216. Moreover, according to this aspect, the cloud infrastructure, (e.g., the Parallels Cloud Infrastructure) issues security tokens/certificates to the command software agent 314 and the client software module 216 for further secure connection.

Once secure communication is established using one of these modes described, the client software module 216 can form and send a command object to the command software agent 314 during operation that will contain the user intent and related parameters. Thus, for the exemplary instruction noted above (i.e., "Using Parallels Client, Find for photos taken last winter in Alps on my computer"), the command object will include the parameters relating to the request that include the requested object type: electronic photographs, the time frame: last winter (e.g., December 2015-February 2016), the location of the photographs: the Alps, and the location of the stored files: My computer (e.g., memory 316 on personal computer 120).

Thus, when the personal computer 120 receives the command object, the command software agent 314 (i.e., the Parallels Agent) is configured to process the command object, and, depending on the command and its parameters, execute the desired action, such as using a system-wide desktop search feature like Spotlight to find the requested data on the computer 120 in memory 316, for example. In other words, the command software agent 314 is configured to parse the command and use existing capabilities specific to the legacy operating system (for example, scripting, user interface automation, and user interface accessibility API) to execute the command.

According to an exemplary aspect, a command object is generated based on a user's "intent". Thus, when a user's intent is recognized by the IPA 214, the IPA 214 calls back to an IPA extension and passes an instance of one of intent-specific objects to the extension (e.g., for Siri, a subclass of INIntent class is passed). This object's properties contain all the data that the IPA managed to recognize and extract from user's spoken command. For example, for a photo search command, the intent object would contain all or any of the follow properties/parameters: range of dates the photos were taken; location place mark (e.g., an object that is constructed by the IPA 214 and contains geolocation parameters, address, and the like); search terms; person objects/identifiers (i.e., denoting people on photos to search for, such as name, alias, relationships, and the like); photo album name; photo attributes (e.g., still/video, orientation, filters, whether it's a selfie or not, and the like).

Furthermore, according to the exemplary aspect, based on the intent type, the IPA extension creates an instance of a serializable command object, and sets its parameters as follows, for example: command object unique identifier (e.g., UUID); command object type (e.g., one of CommandSearchForPhotos, CommandLaunchApp, CommandStartVoIPCall, and the like); a command payload, for example, a set of key-value pairs (i.e., where a value can be a key-value pair itself) that is filled with data from Intent object properties mentioned above. It is noted that exact command payload depends on the object type (i.e., intent) and implementation. For example, it can be described via XML Schema, JSON schema or other structured data notation like Google Protocol Buffers, so both the command software agent 314 and the client software module 216 are able to serialize and de-serialize the command.

Before sending the command object to the command software agent 314 component via the network (e.g., network 130), the client software module 216 component serializes it into a sequence of bytes. Moreover, on the command software agent 314 side, the byte stream is de-serialized and the command object is reconstructed by the command software agent 314 for further processing. Again, it is noted that the exact serialization/de-serialization technique can be implementation-dependent, for example, using XML, JSON, Protocol Buffers, and the like.

Moreover, it should be appreciated that the user requested command results can be presented to the user 101 in various ways, depending on the command itself, and the command software agent 314 execution configuration. For example, the user 101 could include a command to "display results on my computer" or "transmit photographs to my mobile device". In another aspect, if the user 101 is sitting at the desktop computer 120 and uses the IPA 214 on the mobile device 110 only to interact with the desktop computer 120 and has configured the two devices accordingly, command execution results, such as the identified electronic photographs, can be automatically displayed on the monitor of the computer 120. Alternatively, if the desktop computer 120 is not in the vicinity of the mobile device 110 (e.g., if the devices are set for Bluetooth communication, but there is no current connection between devices 110 and 120), and the user 101 interacts with the remote session on the computer 120 via the client software module 216, remote computer screen image with the command execution results is displayed in the client user interface on the mobile device 110. In one aspect, this user interface can be an interface provided by the client software module 216 itself. Moreover, in another example, the command execution result (e.g., a list of identified electronic photographs) can be transferred back by the command software agent 314 to the client software module 216, which in turn forms a response object for the IPA 214 (in accordance to IPA API), so that results appear in the user interface for the IPA 214 for further interaction.

Accordingly, it should be appreciated that by using the IPA 214 installed on the mobile device 110, the user 101 can not only work with the mobile device 110 using the IPA 214, but can initiate tasks that can be performed on a remote computer, such as personal computer 120. In this regard, the IPA 214 handles user interaction and recognizes user's intents and the parameters relating to the request. Moreover, the actual execution of the corresponding command is handed off to the remote computer 120 and executed by the linked software agent installed thereon, making the IPA 214 an unified interface for user interaction with both with mobile device 110 and desktop computer 120.

Figure 4:
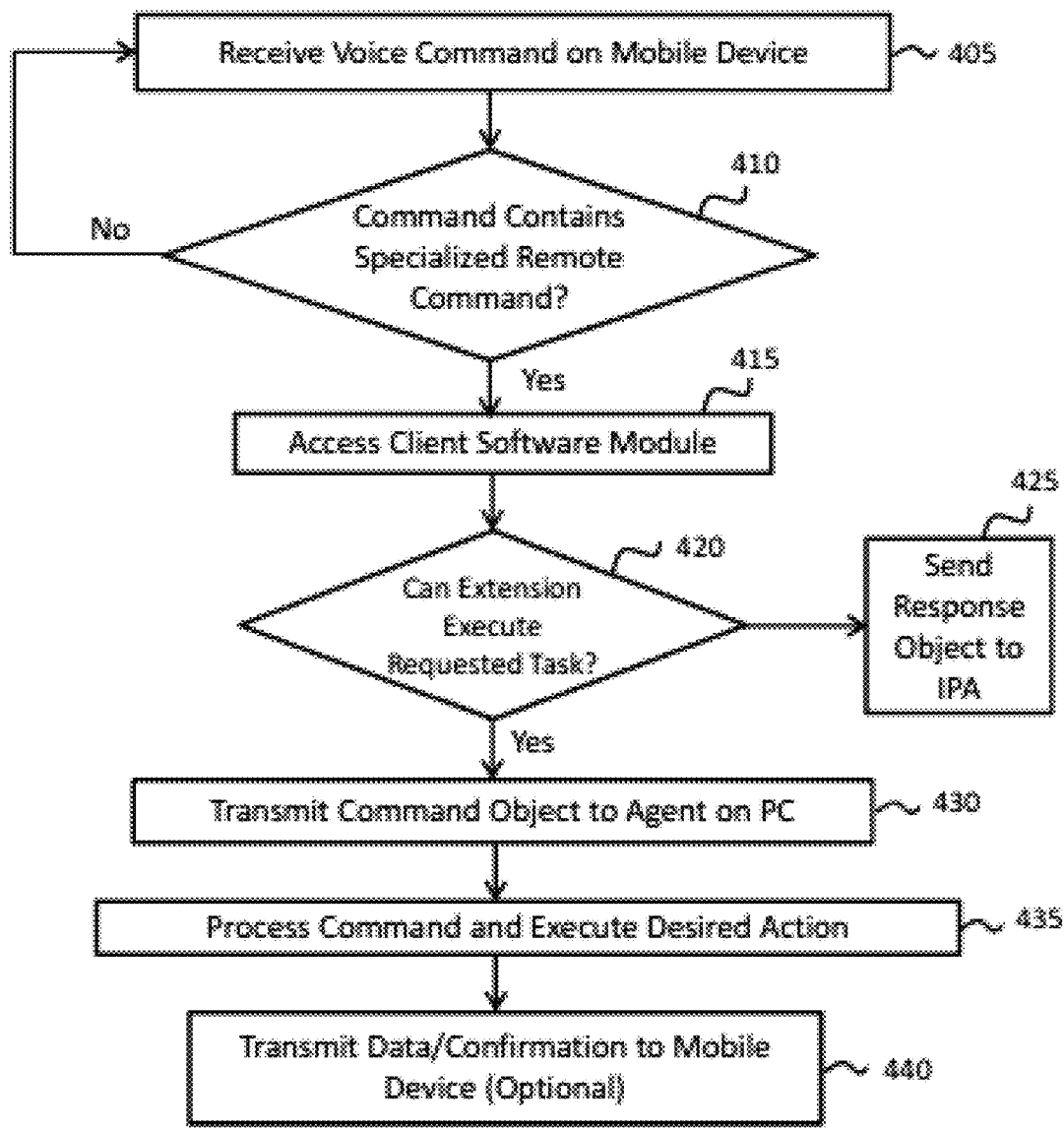
FIG. 4 illustrates a flowchart for a method for enabling voice recognition for legacy operating systems of computing devices according to an exemplary embodiment.

FIG. 4 illustrates a flowchart for a method for enabling voice recognition for legacy operating systems of computing devices according to an exemplary embodiment. It should be appreciated that the following description of the exemplary method makes reference to the system and components described above with respect to FIGS. 1-3.

As shown, initially, at step 405, the user 101 enters a voice command on the mobile device 110, by speaking a requested command into the microphone of the mobile device 110, for example. Next, at step 410, an IPA 214 running on the mobile device 110 (which has been launched by the user 101) receives the command and translates the instructions into parsed text used existing automatic voice recognition techniques, for example. Furthermore, the IPA 214 can determine whether the commands include a user intent to perform a task, such as accessing an electronic file, on a secondary computing system that is communicatively coupled to the mobile device 110. More particularly, the secondary computing system can be a personal computing device 120 with legacy operating system and can be associated with a specific identification (e.g., "Parallels Client"). Thus, at step 410, the IPA 214 can determine whether the voice instruction entered by the user 101 has a request to perform a specialized remote command, such as access an electronic filed using "Parallels Client".

Next, at step 415, the operating system 212 of the mobile device 110 will access the client software module 216, i.e., the "Parallels Client". This software application extension will then determine whether it can perform the requested task, which, in one exemplary aspect, may be by accessing a task database 218. For example task database 218 may include a list of tasks that can be executed by a command software agent 314 installed on the computing device 120. At step 420, the software application extension determines whether it can handle the requested task. In one aspect, if the software application extension requires the main application to handle the task/instruction requested by the user 101, then at step 425 the software application extension can return a corresponding response object to the IPA 214 that can, in turn, launch/activate the main application and pass user activity details to the main application via a user activity software object, such as an NSUserActivity. Alternatively, if the software application extension can execute the requested task, a command object that includes the parameters related to the request will be generated and transmitted by the mobile device 110 to the computing device 120.

As described above, the computing device 120 includes a command software agent 314 that has been installed thereon and previously linked to the client software module 216. The command software agent 314 is configured to process the command object by interpreting the instructions and parameters to determine the requested task, which is then processed and executed on the desired action at step 440. Moreover, the actual execution of the task may depending on configuration settings as described above. In one exemplary aspect, if the mobile device 110 is located remotely relative to the computing device 120, relevant data (e.g., requested electronic photographs) can be accessed on the hard drive of the computing device 120 and returned to the mobile device 110. Thus, it should be appreciated that the disclosed method provides a mechanism for enabling a user to enter voice commands to perform sophisticated actions on a computing device that includes a legacy operating system and otherwise cannot receive and process such speech based commands.

Figure 5:
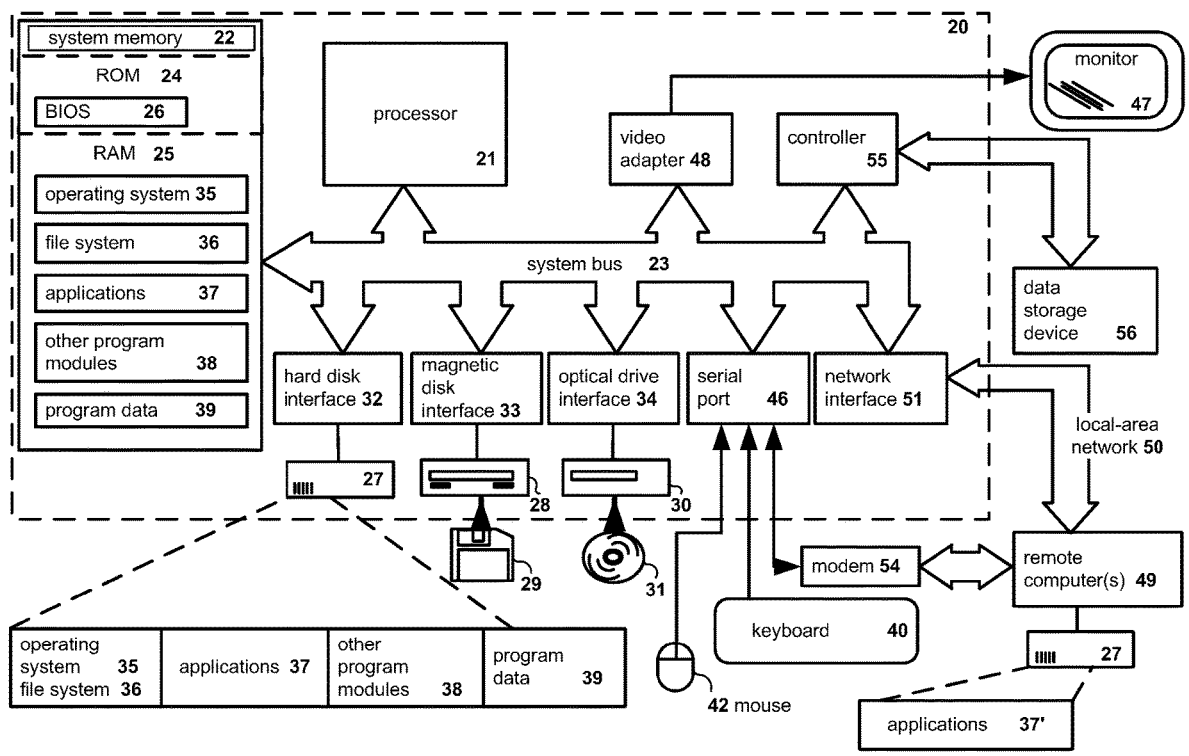
FIG. 5 illustrates a block diagram of an example of a general-purpose computer system on which the disclosed system and method can be implemented according to an example aspect.

FIG. 5 illustrates a block diagram of an example of a general-purpose computer system on which the disclosed system and method can be implemented according to an example aspect. More particularly, a general purpose computing device is provided in the form of a computer system 20 that illustrates exemplary components that can be provided for a computing device, such as mobile device 110. As shown, the computer system 20 can include a processing unit 21, a system memory 22, and a system bus 23 that couples various system components including the system memory to the processing unit 21. It should be appreciated that processing unit 21 can correspond to CPU 210, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like, provided for receiving speech based commands, for example.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, such as computing device 120, a server, a router, a network PC, a peer device or other common network node, and typically includes many or all of the elements described above relative to the computer 20. The logical connections include a network interface 51 and a wide area network (WAN). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. One or more of the above-noted components can correspond to I/O interface 220 according to an exemplary aspect.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for controlling a remote computer over a remote session established via a cloud infrastructure using an intelligent personal assistant (IPA) executing on a mobile device of a user, the method comprising:
   receiving, by the IPA, a speech-based instruction from the user of the mobile device;
   analyzing, by the IPA, the speech-based instruction to determine whether the speech-based instruction includes an intent of the user to execute a task requiring initiation of the remote session to the remote computer where the determination as to whether the speech-based instruction includes the intent of the user comprises:
      identifying whether the speech-based command comprises an identity of the task to be executed; and
      determining whether the speech-based command comprises speech-based content defining a set of intent-specific objects where the set of intent-specific objects are established in dependence upon the identity of the task to be executed;
   upon a positive determination that the speech-based instruction includes an intent of the user to initiate a remote session to the computer performing, with the IPA, the steps of:
      identifying a remote client on the mobile device for creating the remote session with the remote computer via the cloud infrastructure where the remote computer is established in dependence upon an identity of the remote computer extracted by the IPA from the speech-based instruction;
      generating a command object comprising intent-specific objects extracted by the IPA from the speech-based instruction;
      transmitting the command object through the remote session to the remote computer;
      receiving results from the execution of the task within the remote session from the remote computer; and
      presenting the results from the execution of the task in an interface of the remote client; wherein
   the command object causes a software agent on the remote computer to execute the task; and
   the software agent on the remote computer executes the task in dependence upon the set of intent-specific objects within the command object.

2. The method according to claim 1, wherein
   the command object includes parameters relating to the execution of the task; and
   the remote computer executes the task within the remote session in dependence upon at least the parameters within the transmitted command object.

3. The method according to claim 1, wherein
   the remote client is configured to execute an authentication prior to executing the task;
   the authentication comprises the steps of:
      authenticating the user with the cloud infrastructure;
      determining whether the remote computer is registered as a remote host with the cloud infrastructure;
      upon a positive determination that the remote computer is registered as a remote host with the cloud infrastructure obtaining security tokens associated with the remote computer from the cloud infrastructure; and
      establishing the remote session with the registered computer using the security tokens; and
   the remote session is a secure remote session.

4. The method according to claim 1, further comprising:
   installing the remote client on the mobile device;
   installing the software agent on the remote computer; and
   prior to transmitting the command object, pairing the remote client to the software agent based on at least one of a user identification, an account identification and a password.

5. The method according to claim 1, wherein
   analyzing the speech-based instruction comprises:
      performing automatic speech recognition and transcription of the speech-based instruction;
      identifying an identification of the remote client with the transcribed speed-based instruction; and
      calling the remote client based on the identification.

6. The method of claim 1, further comprising:
prior to establishing the remote session with the remote computer providing task information from the IPA to the remote client using an operating system (OS) object;
performing a portion of the task with an application capable of performing the task; and
transmitting the OS object from the application through the remote session to another instance of the application executing on the remote computer for completion of the task; wherein
the application is in execution upon the mobile device of the user.

7. A method for controlling a remote computer over a remote session established via a cloud infrastructure using an intelligent personal assistant (IPA) executing on a mobile device of a user, the method comprising:
receiving upon a remote computer a command object from the IPA through the remote session;
establishing a software agent on the remote computer to execute a task where the software agent is established in dependence of the command object received from the IPA; and
transmitting results from the execution of the task within the remote session from the remote computer to at least one of the mobile device and the IPA; wherein
the command object was generated upon the mobile device with the IPA in dependence upon a speech-based instruction from the user processed upon the mobile device where the speech-based instruction comprising a request to execute the task on the remote computer;
the IPA analyzes the speech-based instruction to determine whether the speech-based instruction includes an intent of the user to initiate the remote session to the remote computer;
the IPA identifies a remote client on the mobile device for creating the remote session with the remote computer via the cloud infrastructure and generates the command object;
the determination as to whether the speech-based instruction includes the intent of the user comprises:
identifying whether the speech-based command comprises an identity of the task to be executed; and
determining whether the speech-based command comprises speech-based content defining a set of intent-specific objects where the set of intent-specific objects are established in dependence upon the identity of the task to be executed; and
the command object comprises the identity of the task and the intent-specific objects extracted by the IPA from the speech-based instruction.

8. The method according to claim 7, wherein
the command object includes parameters relating to the execution of the task; and
the remote computer executes the task within the remote session in dependence upon at least the parameters within the transmitted command object.

9. The method according to claim 7, wherein
the remote client is configured to execute an authentication prior to executing the task;
the authentication comprises the steps of:
authenticating the user with the cloud infrastructure;
determining whether the remote computer is registered as a remote host with the cloud infrastructure;
upon a positive determination that the remote computer is registered as a remote host with the cloud infrastructure obtaining security tokens associated with the remote computer from the cloud infrastructure; and
establishing the remote session with the registered computer using the security tokens; and
the remote session is a secure remote session.

10. The method according to claim 7, further comprising:
installing the remote client on the mobile device;
installing the software agent on the remote computer; and
prior to transmitting the command object the software agent pairs with the remote client based on at least one of a user identification, an account identification and a password.

11. The method according to claim 7, wherein
the IPA analyzes the speech-based instruction with a process comprising:
performing automatic speech recognition and transcription of the speech-based instruction;
identifying an identification of the remote client with the transcribed speed-based instruction; and
the IPA calls the remote client based on the identification.

12. The method of claim 7, wherein
prior to establishing the remote session with the remote computer the IPA:
provides task information to the remote client using an operating system (OS) object;
performs a portion of the task with an application capable of performing the task; and
transmits the OS object from the application through the remote session to another instance of the application executing on the remote computer for completion of the task; and
the application is in execution upon the mobile device of the user.

13. A method for controlling a remote computer over a remote session established via a cloud infrastructure using an intelligent personal assistant (IPA) executing on a mobile device of a user, the method comprising:
receiving upon a remote computer a command object from the IPA through the remote session;
establishing a software agent on the remote computer to execute a task where the software agent is established in dependence of the command object received from the IPA; and
transmitting results from the execution of the task within the remote session from the remote computer to at least one of the mobile device and the IPA; wherein
the command object was generated upon the IPA with a process comprising the steps of:
receiving, by the IPA, a speech-based instruction from a user of the mobile device, the speech-based instruction indicating a request to execute a task on the remote computer;
analyzing, by the IPA, the speech-based instruction to determine whether the speech-based instruction includes an intent of the user to initiate a remote session to the computer;
determining, by the IPA, a remote client on the mobile device for creating a remote session with the computer;
generating, by the IPA, a command object that includes parameters relating to the execution of the task; and
transmitting the command object through the secure remote session to the computer, wherein the command object causes a software agent on the computer to execute the task based at least partially on the parameters included in the command object; wherein the determination as to whether the speech-based instruction includes the intent of the user comprises:
    identifying whether the speech-based command comprises an identity of the task to be executed; and
    determining whether the speech-based command comprises speech-based content defining a set of intent-specific objects where the set of intent-specific objects are established in dependence upon the identity of the task to be executed; and
the command object comprises the identity of the task and the intent-specific objects extracted by the IPA from the speech-based instruction.

14. The method according to claim 13, wherein
an operating system of the remote computer does not natively support speech-based instructions.

15. The method according to claim 13, wherein
the remote client is configured to:
    authenticate the user with the cloud infrastructure;
    determine whether the remote computer is registered as a remote host with the cloud infrastructure;
    obtain security tokens associated with the remote computer from the cloud infrastructure; and
    establish a secure remote session with the registered computer using the security tokens.

16. The method according to claim 13, wherein
an operating system of the remote computer does not natively support speech-based instructions and
the remote client is configured to:
    authenticate the user with the cloud infrastructure;
    determine whether the remote computer is registered as a remote host with the cloud infrastructure;
    obtain security tokens associated with the remote computer from the cloud infrastructure; and
    establish a secure remote session with the registered computer using the security tokens.

17. The method according to claim 13, further comprising:
    installing the remote client on the mobile device;
    installing the software agent on the remote computer; and
    prior to transmitting the command object the software agent pairs with the remote client based on at least one of a user identification, an account identification and a password.

18. The method according to claim 13, wherein
the IPA analyzes the speech-based instruction with a process comprising:
    performing automatic speech recognition and transcription of the speech-based instruction;
    identifying an identification of the remote client with the transcribed speed-based instruction; and
the IPA calls the remote client based on the identification.

19. The method of claim 13, wherein
prior to establishing the remote session with the remote computer the IPA:
    provides task information to the remote client using an operating system (OS) object;
    performs a portion of the task with an application capable of performing the task; and
    transmits the OS object from the application through the remote session to another instance of the application executing on the remote computer for completion of the task; and
the application is in execution upon the mobile device of the user.

\* \* \* \* \*